(12) United States Patent
Khachatryan

(10) Patent No.: US 11,087,641 B1
(45) Date of Patent: Aug. 10, 2021

(54) FLOW MODEL

(71) Applicant: Legacy Ventures LLC, Nashville, TN (US)

(72) Inventor: Tigran Khachatryan, Orange, CA (US)

(73) Assignee: Legacy Ventures LLC, Nashville, TN (US)

( * ) Notice: Subject to any disclaimer, the term of this patent is extended or adjusted under 35 U.S.C. 154(b) by 257 days.

(21) Appl. No.: 16/380,957

(22) Filed: Apr. 10, 2019

Related U.S. Application Data

(60) Provisional application No. 62/657,051, filed on Apr. 13, 2018.

(51) Int. Cl.
*G09B 23/30* (2006.01)
*G09B 23/34* (2006.01)

(52) U.S. Cl.
CPC ........... *G09B 23/303* (2013.01); *G09B 23/34* (2013.01)

(58) Field of Classification Search
CPC ....... G09B 23/28; G09B 23/30; G09B 23/303
USPC .......................... 434/262, 267, 268, 270, 272
See application file for complete search history.

(56) References Cited

U.S. PATENT DOCUMENTS

| | | | | |
|---|---|---|---|---|
| 3,704,528 A * | 12/1972 | Lewis | .................... | G09B 23/30 434/268 |
| 5,141,847 A * | 8/1992 | Sugimachi | ............... | A01N 1/02 435/1.2 |
| 5,632,623 A * | 5/1997 | Kolff | ...................... | G09B 23/28 434/267 |
| 5,634,797 A * | 6/1997 | Montgomery | ....... | G09B 23/286 434/268 |
| 6,062,866 A * | 5/2000 | Prom | ..................... | G09B 23/28 434/268 |
| 6,205,871 B1* | 3/2001 | Saloner | .................. | B33Y 80/00 73/866.4 |
| 6,517,354 B1* | 2/2003 | Levy | ...................... | G09B 23/28 434/262 |
| 6,790,043 B2* | 9/2004 | Aboud | ................. | G09B 23/303 434/262 |
| 8,608,484 B2* | 12/2013 | Kalafut | .................. | G09B 23/32 434/268 |
| 9,569,985 B2* | 2/2017 | Alkhatib | ............... | G09B 23/303 |
| 9,881,523 B2* | 1/2018 | Sweeney | ................ | G09B 23/32 |
| 9,965,591 B2* | 5/2018 | Christiansen | ............ | G16B 5/00 |
| 10,235,906 B2* | 3/2019 | Fernandez | ........... | G09B 23/303 |
| 10,540,913 B2* | 1/2020 | Kinsella | ............... | G09B 23/285 |
| 10,672,298 B2* | 6/2020 | Newberry | ............... | F03B 13/14 |
| 10,726,743 B2* | 7/2020 | Segall | ................ | A61B 17/0057 |
| 10,885,813 B2* | 1/2021 | Krummenacher | ..... | G09B 23/30 |
| 2010/0196865 A1* | 8/2010 | Kays | ...................... | G09B 23/32 434/268 |

* cited by examiner

*Primary Examiner* — Kurt Fernstrom
(74) *Attorney, Agent, or Firm* — Shane Cortesi

(57) ABSTRACT

A flow model is described. The flow model may include one or more distal arteries that drain into a reservoir, preferably, a sealed cavity. Pumps and artificial organs, such as an artificial human heart, may be used to create a more lifelike experience. One or more neurovascular devices, such as thrombectomy devices, may be deployed in the simulated blood vessels for training purposes.

21 Claims, 8 Drawing Sheets

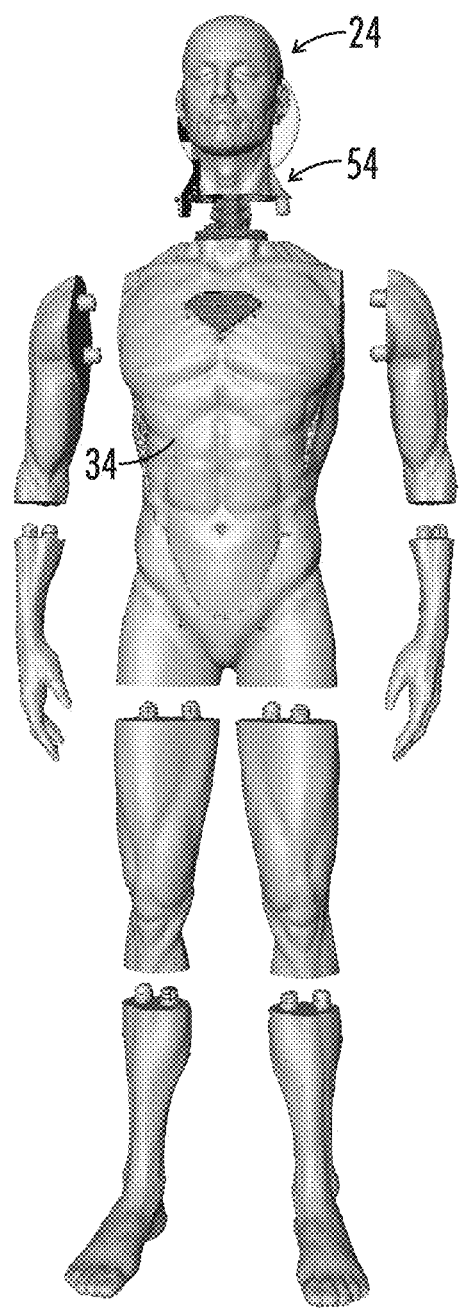
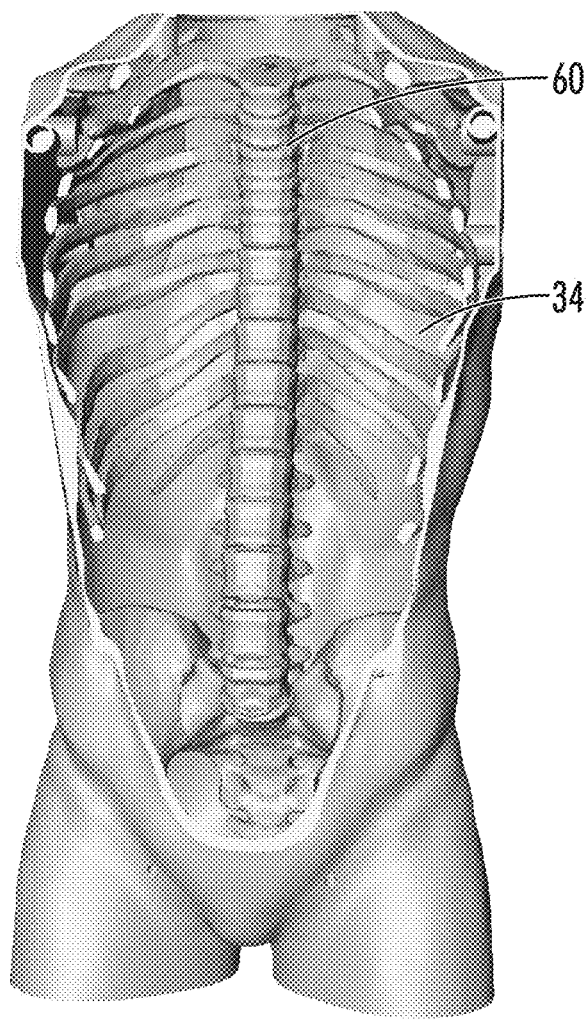
*FIG. 2B*  *FIG. 2C*

FLOW MODEL

RELATED APPLICATIONS

This application claims priority under 35 USC 119 to U.S. Patent Application No. 62/657,051, filed Apr. 13, 2018, the entire contents of which are incorporated herein by reference.

BACKGROUND

Technical Field

The present invention relates to flow models for training surgeons.

Background of the Invention

Training of medical students and physicians historically has been performed through dissection of human corpses and hands-on training on real patients. With the introduction of newer treatment methods cadaveric training has become more difficult to achieve. This is particularly true about endovascular interventions. Although hands-on endovascular training is possible on a cadaver, it has many significant limitations such as absence of blood flow, clotted blood within the circulation, high cost and special environmental requirements for cadavers. Hands-on training on a real-life patient has its unique limitations such as liability issues, ethical issues, inability to test new devices and possible absence of a specifically required anatomical situation at a given time. Thus, animal models became widely utilized in experimental settings. However, significant structural differences between human and animal anatomy don't make it plausible for training purposes and can be utilized only for testing novel devices. Besides, they also have limitations because of special environmental requirements, ethical issues etc.

With the emergence of 3D printing technology, artificial simulation of the vascular tree became widely available. Initially only large vessels were simulated because the technology did not provide enough quality for smaller vessels. However, with the advancements in this area, flow models of intracranial and other small vessels became widely available. Even with the current sophisticated 3D printing technology, there are some limitations in both preparation technique and the usability of the final product.

As of today, it is believed that all the flow models are prepared by creating a lumen of a vessel using different support materials (water soluble, chemically soluble, melting, etc.). Once the mold of the lumen is ready, it is coated by silicone or other flexible material and the support material is removed from the lumen by appropriate technology for the given material. This increases the time and cost of vessel preparation by adding additional steps, decreases the quality and limits the minimum size of a vessel that can be modeled, as 3D printing technology of that kind can print with the minimum layer thickness of 50 micrometers. Actual lumen diameter that can be printed with 50 micrometer layer height is 1 mm, however current models have the smallest diameter of 2-3 mm.

Additionally, current flow models have sophisticated heartbeat simulation which is not only expensive, but doesn't add any value to the flow model. Besides, it is located outside the flow model and in some models can be as large as a carry-on baggage.

As mentioned previously, current vascular models have a collecting system, which distorts the anatomy and limits the number of vessels one can simulate. The outside space of the vessels is either empty or filled by a gel to support the model.

One of the most important limitations of flow models, which are currently available in the market, is that, to my knowledge, all of them have a vessel or vessels which are divided in branches and then are collected back into a single or couple draining tubes for outflow (closed design). This distorts the anatomy and makes the flow model look more like a pathological structure than normal vasculature under the X-Ray. Thus, it can only be used for demonstrational purposes, initial testing of a new device or test the suitability of a given device for a given pathology (takes about a month to prepare and test it because of the lengthy post processing time).

BRIEF SUMMARY

The present disclosure provides flow models as described herein.

In one embodiment, the present disclosure provides a flow model for stimulating the vasculature system of an animal comprising: a pump configured to transport a liquid; a reservoir downstream from the pump and configured to hold a liquid; at least one distal artificial artery downstream from the pump and upstream from the reservoir. The at least one artificial artery may be generally tubular in shape and curved. Optionally, the at least one distal artificial artery comprises an open proximal end and an open distal end. Optionally, the open distal end is not connected to a tube and located in the reservoir. Optionally, the at least one distal artificial artery is configured to transport a liquid from the open proximal end to the open distal end and into the reservoir. Optionally, the flow model further comprises at least one artificial vein downstream from the reservoir and the at least one distal artificial artery and configured to transport a liquid from the reservoir. Optionally, the pump is configured to pump the liquid from the pump, into the at least one distal artificial artery open proximal end, then into the at least one distal artificial artery open distal end, then into the reservoir, and then into the at least one artificial vein.

Optionally, the reservoir is sealed/water tight. Optionally, the reservoir is located in an artificial human head. Optionally, the artificial human head comprises an artificial nose and further wherein the at least one artificial vein has a proximal end located in the artificial nose. Optionally, the at least one artificial vein is configured to at least partially return the liquid back to the pump after exiting the reservoir. Optionally, the flow model comprises a plurality of distal artificial arteries comprising an open distal end not connected to a tube and configured to drain into the reservoir. Optionally, at least some of the plurality of distal artificial arteries are curved. Optionally, the pump is battery-powered. Optionally, the pump comprises a motor and an off and off switch. Optionally, the pump is a pulsatile pump with adjustable heart rate, stable pressure and optional heater. Optionally, the distal artificial arteries are made by material jetting 3D printing. Optionally, the at least one distal artificial artery has a minimum diameter of not more than about 35 micrometers. Optionally, the flow model further comprises an artificial heart. Optionally, the artificial heart is located in a chest portion of an artificial human and the at least one distal artificial artery is located in a head portion of the artificial human. Optionally, the pump is at least partially located in the artificial heart. Optionally, the artificial heart further comprises at least one proximal artificial artery downstream from the pump, upstream from the at least one distal artificial artery, at least partially located in the heart, and comprising at least one valve. Optionally, the flow model further comprises at least one proximal artificial artery comprising an open proximal end connected to the heart and an open distal end attached to a proximal connector. Optionally, the flow model further comprises at least one intermediate artificial artery comprising an open proximal end removably attached to the proximal connector and an open distal end. Optionally, the open distal end of the intermediate artificial artery is connected to a distal connector. Optionally, the distal connector is located in the neck portion of an artificial human and the distal connector connects a plurality of pairs of blood vessels simultaneously. Optionally, the at least one intermediate artery is curved. Optionally, the at least one intermediate artery comprises an arch. Optionally, the reservoir comprises animal blood or artificial animal blood. Optionally, the pump comprises a motor. Optionally, the at least one distal artificial artery comprises an obstruction.

In still further embodiments, the present disclosure provides a method of removing an obstruction comprising the steps of:

a) providing the flow model; and b) using a stent-retriever or other thrombectomy device to remove the obstruction.

BRIEF DESCRIPTION OF THE DRAWINGS

FIG. 2B illustrates a top perspective view of the head, neck and chest portion of the flow model of FIG. 1 with the artificial human's body.

FIG. 2C illustrates a top perspective, cut-away view of the head, neck and chest portion of the flow model of FIG. 1 with the artificial human's body.

DETAILED DESCRIPTION

Figure 1A:
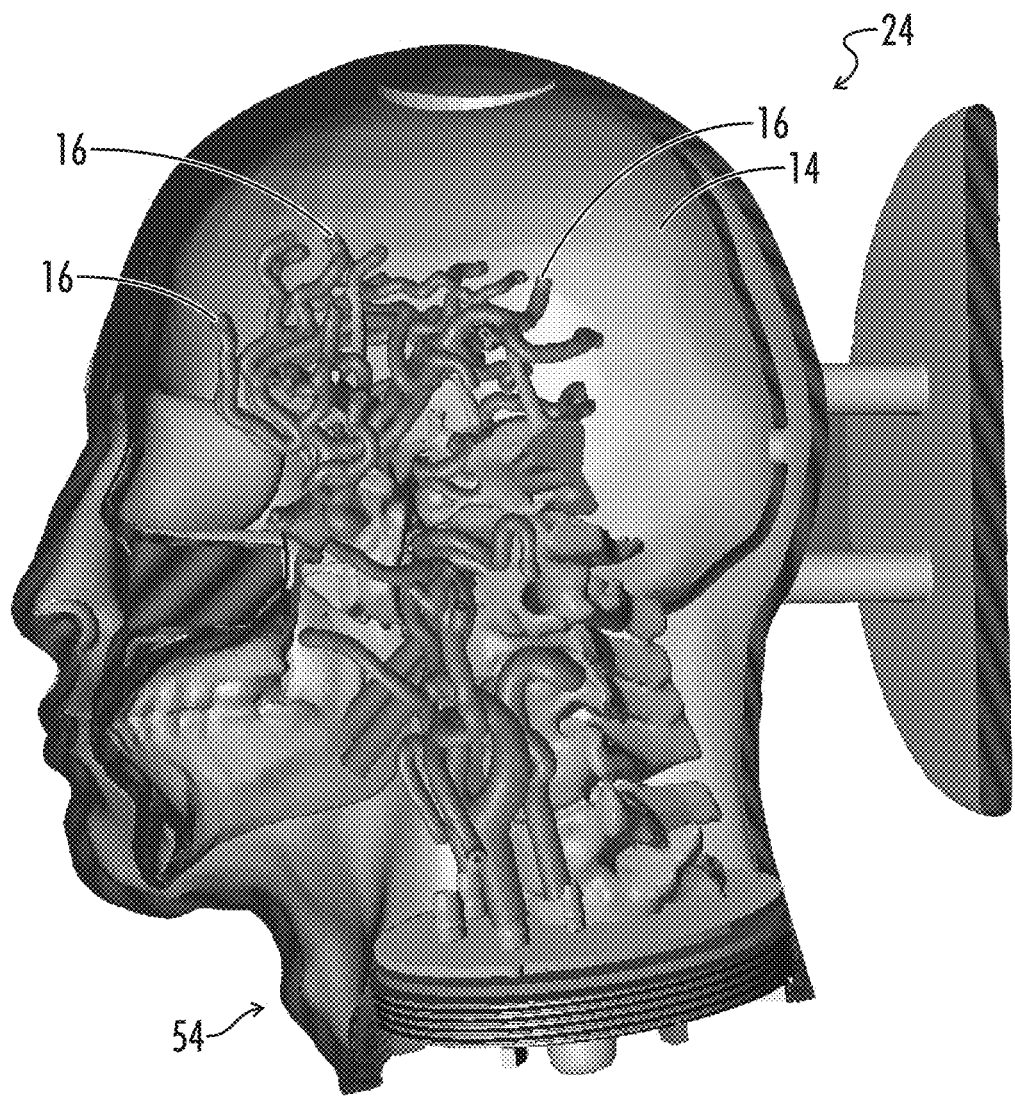
FIG. 1A illustrates a side perspective cut-away view of the head and neck portion of a flow model of an embodiment of the present invention.
Figure 1B:
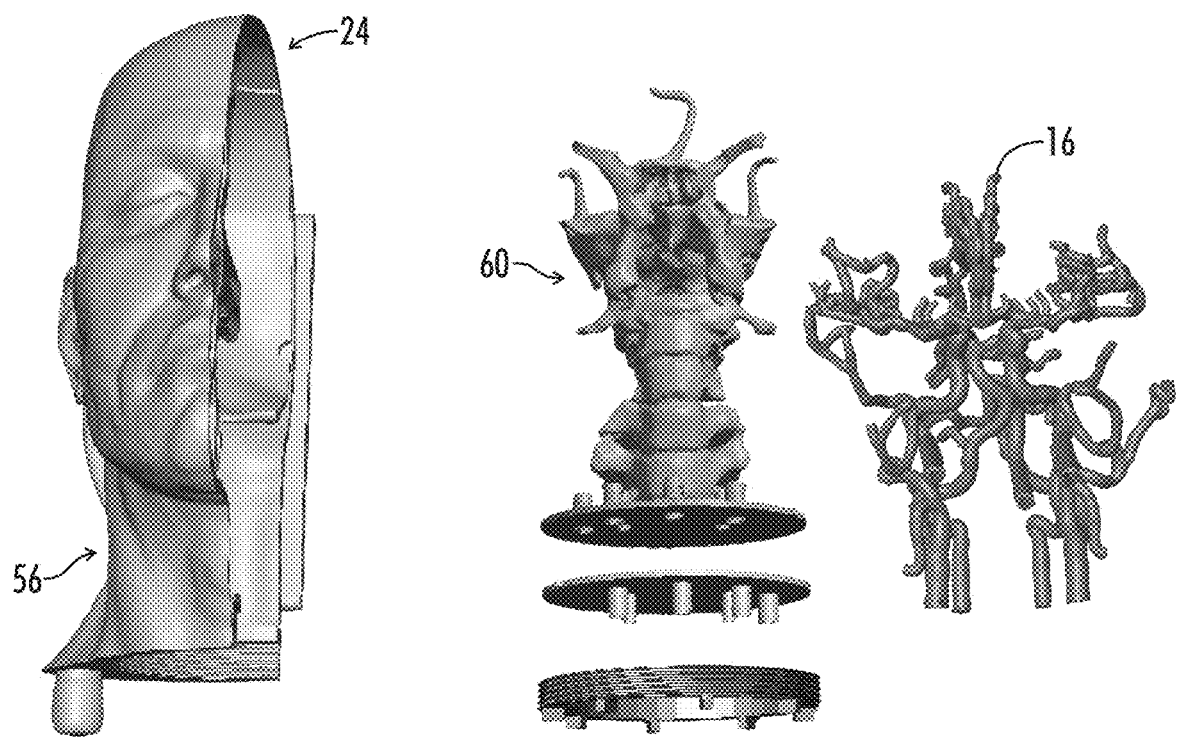
FIG. 1B illustrates a top exploded perspective view of the head and neck portion of the flow model of FIG. 1.

With reference to FIGS. 1-6, the present disclosure provides a flow model for simulating a human or other vasculature system designated by the numeral 10. In the drawings, not all reference numbers are included in each drawing for the sake of clarity.

Figure 5:
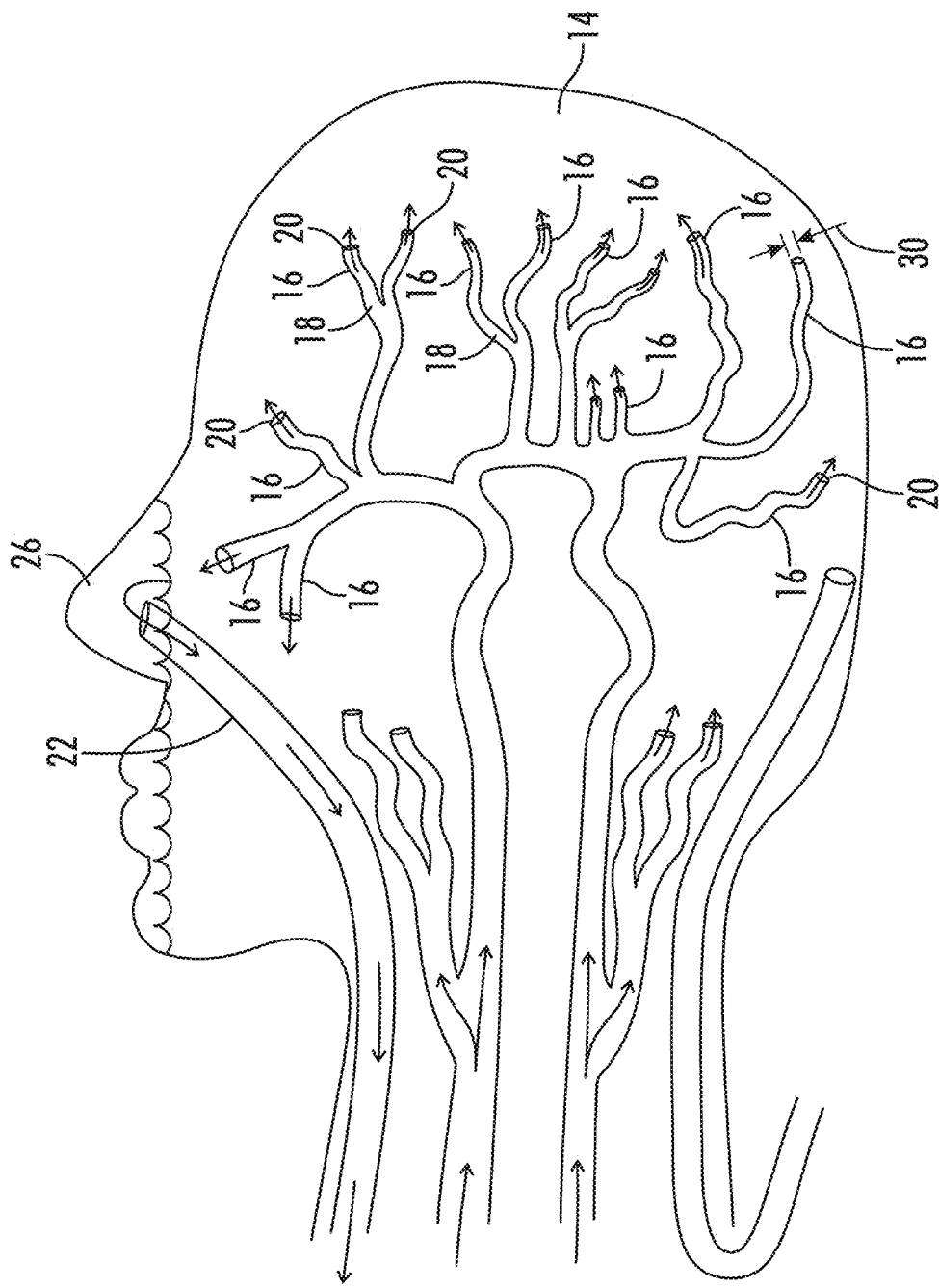
FIG. 5 illustrates a side schematic view of the head portion of a flow model of an embodiment of the present invention.

In some embodiments, the flow model 10 includes a pump 12 configured to transport a liquid. The flow model 10 may further include a reservoir 14 downstream from the pump 12 and configured to hold the liquid. The flow model 10 may further include at least one distal artificial artery 16 (preferably a plurality of distal artificial arteries, as shown in FIGS. 1A, 1B, 2A, and 5) downstream from the pump 12 and upstream from the reservoir 14. The at least one distal artificial artery 16, as well as all the other blood vessels herein, may be in the form of a tube. The term "artificial" as used herein means that the component is used to a simulate an animal (e.g., human) body part. The term "downstream", as used herein, is a relative term to mean that the component is downstream in terms of flow of liquid from the reference component. "Upstream" is a relative term to mean that the component is upstream in terms of flow of liquid from the reference component. The terms "proximal" and "distal" are also relative terms herein, with "proximal" being used to refer to the component that is closer to the pump 12 in terms of liquid flow (i.e., further upstream) from another component and "distal" being downstream from another component. The at least one distal artificial artery 16 may have an open proximal "end" 18 and an open distal "end" 20. It will be understood the vessels herein preferably do not have discrete ends, but rather interconnect to one another. Nonetheless, the terms "proximal end" and "distal end" refer to the respective terminal portions of a particular branch. The proximal and distal ends of the blood vessels herein are preferably open to allow the flow of liquid. For similar reasons, the interiors of the vessels herein are usually hollow. Preferably the open distal end 20 of the distal artificial artery 16 does not drain into another tube and is located in the reservoir, as best seen in FIG. 1A and FIG. 5, allowing the distal artificial artery 16 to freely drain in the reservoir 14, which is preferably a sealed cavity/water tight. The at least one distal artificial artery 16 is preferably configured to transport a liquid from the open proximal end 18 to the open distal end 20 and into the reservoir 14. The flow model 10 preferably includes at least one artificial vein 22 downstream from the reservoir 14 and the at least one distal artificial artery 16 and is configured to transport a liquid from the reservoir 14. Preferably, the pump 12 is configured to pump the liquid from the pump 12, into the at least one distal artificial artery open proximal end 18, then into the at least one distal artificial artery open distal end 20, then into the reservoir 14, and then into the at least one artificial vein 22. It will be understood that the such a flow model 10 may include one or more additional vessels, as described herein, such as proximal artificial arter(ies) 36 and the intermediate arter(ies) 46.

In a preferred embodiment, the blood vessels described herein are printed using a material called TANGOPLUS from Stratasys (Eden Prairie, Minn.). TANGOPLUS utilizes a water soluble support material called SUP705. Vessels can also be directly printed using silicone, however that technology is currently inferior to TANGOPLUS. It is important, however, to mention, that the systems 10 described herein can work with artificial vessels created by any technology, having an open end design or not.

Figure 2A:
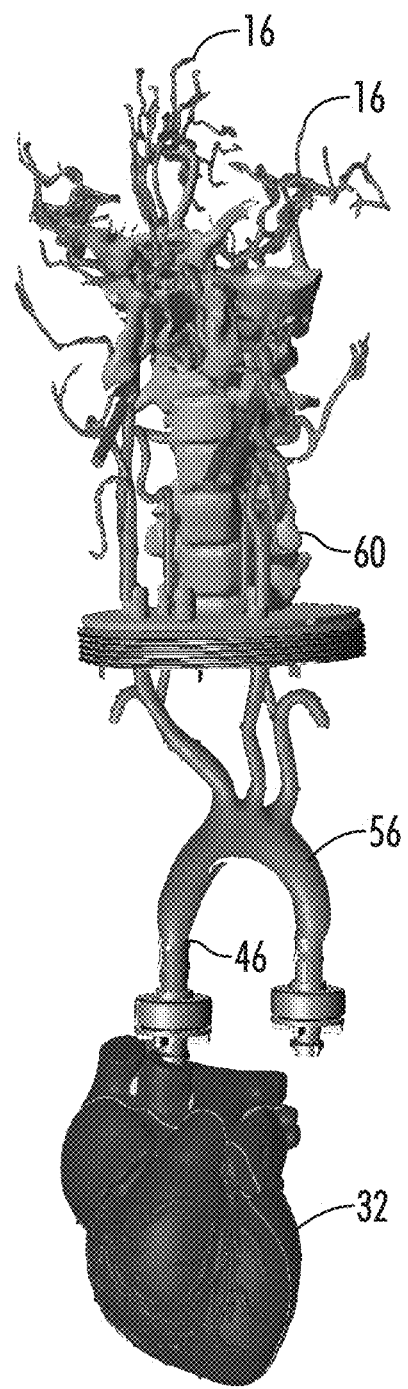
FIG. 2A illustrates a top perspective view of the head, neck and chest portion of the flow model of FIG. 1 without the artificial human's body.
Figure 3:
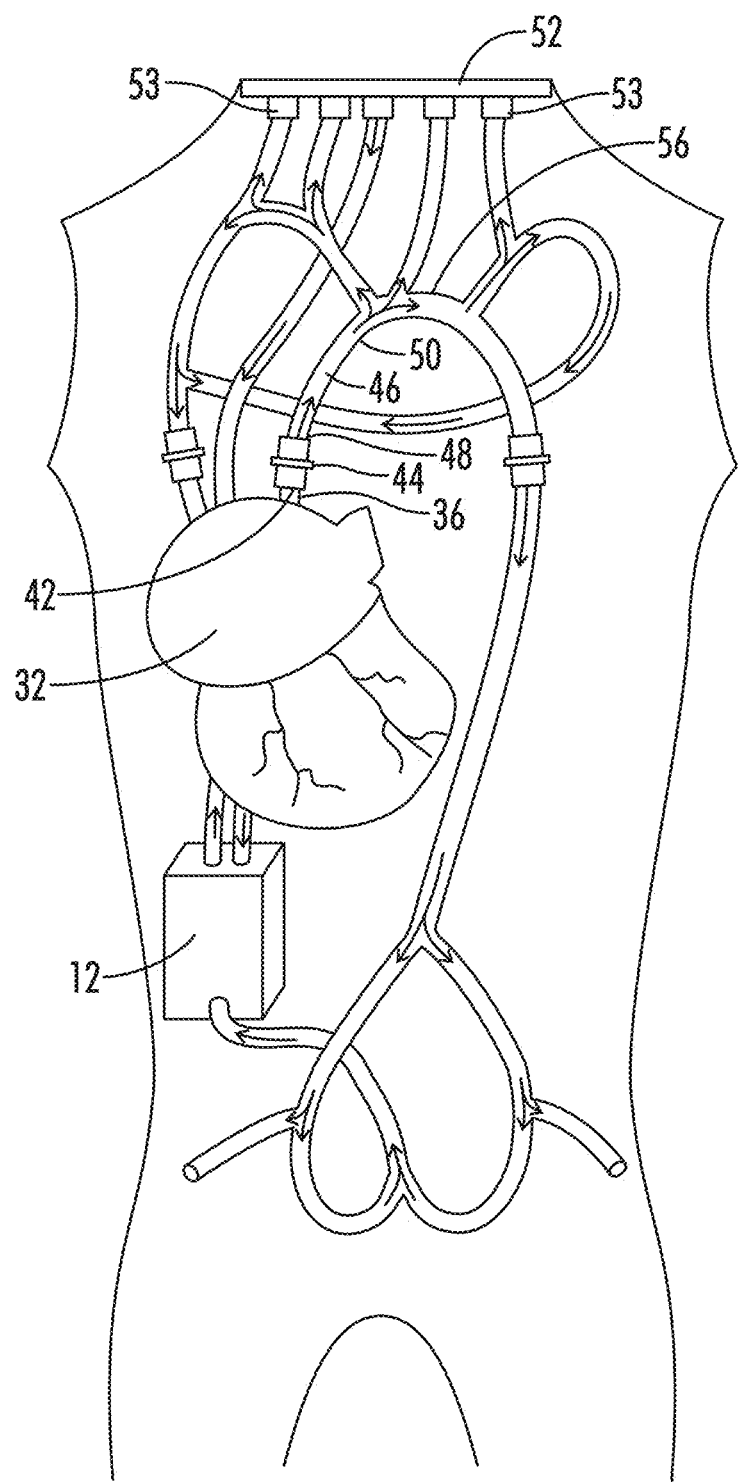
FIG. 3 illustrates a top schematic view of the chest portion of a flow model of an embodiment of the present invention.
Figure 4:
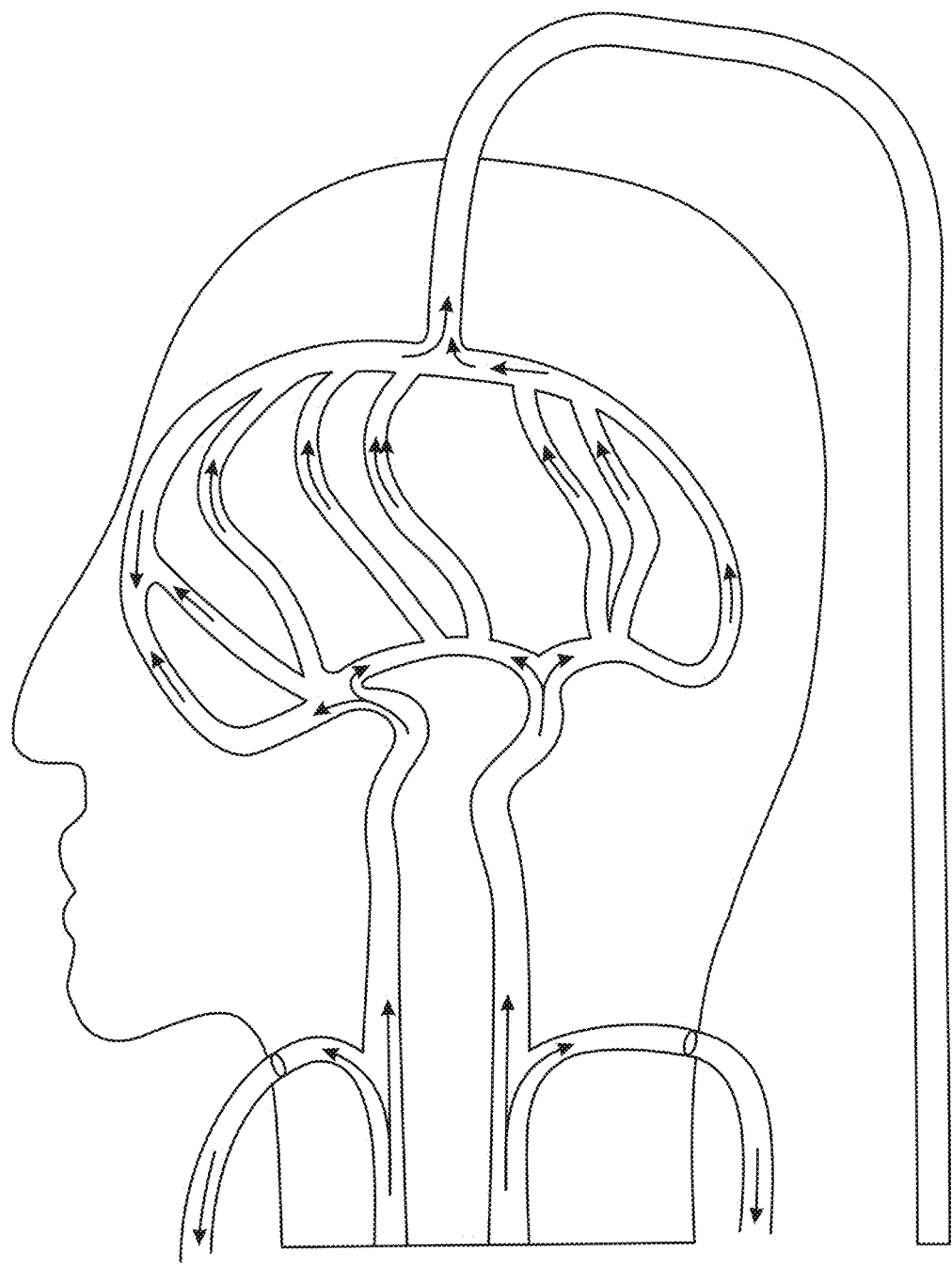
FIG. 4 illustrates a top schematic view of the head portion of a flow model resembling the prior art for purposes of comparison with FIG. 5.
Figure 6:
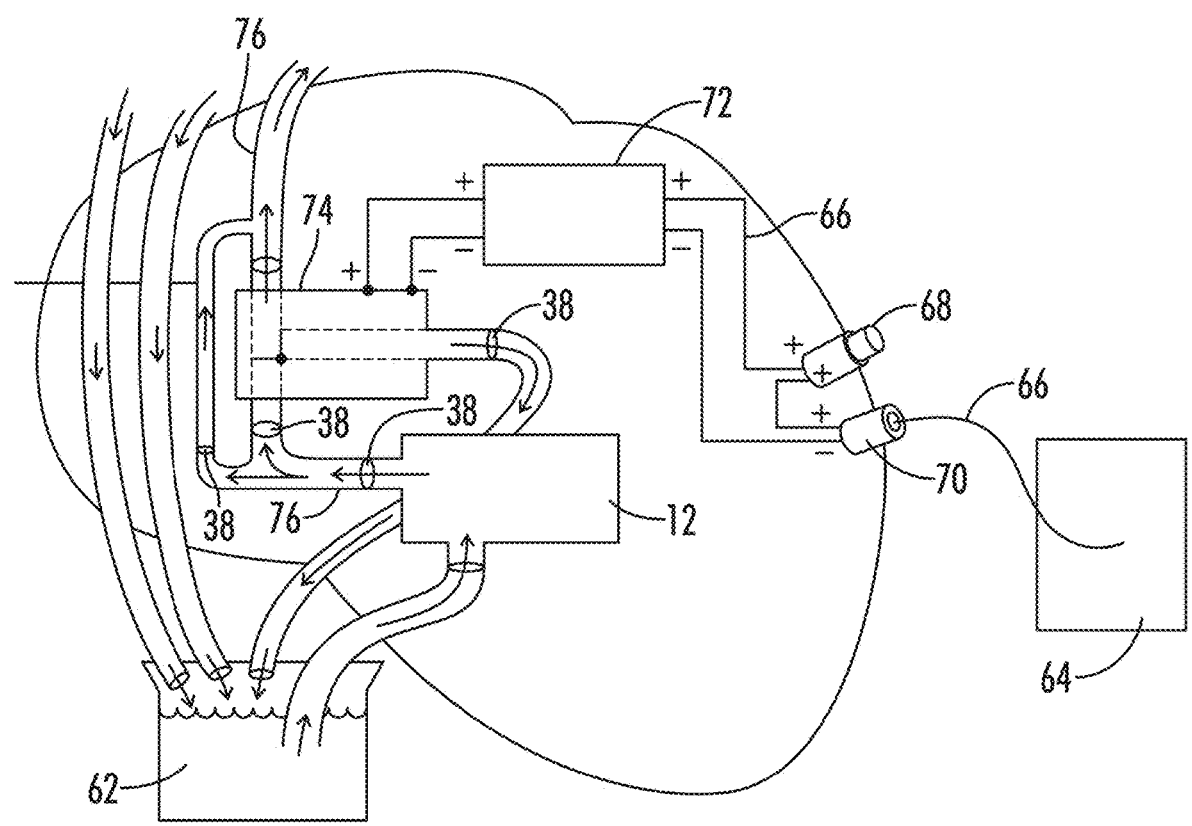
FIG. 6 illustrates a side schematic view of an artificial heart of a flow model of an embodiment of the present invention.

Preferably, the reservoir 14 is located in an artificial human head 24 and the distal artificial artery 16 is an intracranial artery. Optionally, the artificial human head 24 comprises an artificial nose 26 and further wherein the at least one artificial vein 22 has a proximal end 28 located in the artificial nose 26, as best seen in FIG. 5. In some embodiments, the flow model 10 has just one artificial vein 22 located in the human head 26. Optionally, the at least one artificial vein 22 is configured to at least partially return the liquid back to the pump 12 after exiting the reservoir 14, it being understood that there may be multiple veins transporting the liquid. Optionally, the flow model 10 comprises a plurality of distal artificial arteries 16 comprising an open distal end 20 not connected to a tube and configured to drain into the reservoir 14, which is unlike the system shown in FIG. 4 for comparison purposes. Optionally, at least some of the plurality of distal artificial arteries 16 are curved. Optionally, the pump 12 is battery-powered. Optionally, the pump 12 comprises a motor and an off and off switch 68. Exemplary details of the pump 12 and artificial heart 32 are shown in FIG. 6. Optionally, the pump 12 is a pulsatile pump with adjustable heart rate, stable pressure and optional heater. Optionally, the distal artificial arteries 16 are made by material jetting 3D printing. Optionally, the at least one distal artificial artery 16 has a minimum diameter 30 of not more than about 35 micrometers. Optionally, the flow model 10 comprises an artificial heart 32, as shown in FIGS. 2A, 3 and 6. Optionally, the artificial heart 32 is located in a chest portion 34 of an artificial human and the at least one distal artificial artery 16 is located in a head portion 24 of the artificial human. Optionally, the pump 12 is at least partially located in the artificial heart 32. Optionally, the artificial heart 32 further comprises at least one proximal artificial artery 36 downstream from the pump 12, upstream from the at least one distal artificial artery 16, at least partially located in the heart 32 (i.e., in the heart interior), and comprising at least one valve 38. Preferably, the artificial heart 32 is relatively simple in design as shown in FIG. 6 and includes one or more features shown in FIG. 6. Optionally, the flow model 10 further comprises at least one proximal artificial artery 36 comprising an open proximal end (not specifically labelled) connected to the heart 32 and an open distal end 42 attached to a proximal connector 44. Optionally, the flow model 10 further comprises at least one intermediate artificial artery 46 comprising an open proximal end 48 removably attached to the proximal connector 44 and an open distal end 50. Optionally, the open distal end 50 of the intermediate artificial artery 46 is connected to a distal connector 52. Optionally, the distal connector 52 is located in the neck portion 54 of an artificial human and the distal connector 52 connects a plurality of pairs of blood vessels simultaneously, as shown in FIG. 3, where the proximal ends 53 of the distal connector 52 is connected to five blood vessels. Optionally, the at least one intermediate artery 46 is curved. Optionally, the at least one intermediate artery 46 comprises an arch 56. Optionally, the reservoir 14 comprises animal (e.g., human or pig) blood or artificial animal blood. Optionally, the pump 12 comprises a motor. Optionally, the at least one distal artificial artery 16 comprises an obstruction. Optionally, the flow model 10 is used to train a surgeon and is used in a method of removing an obstruction comprising the steps of: a) providing the flow model 10; and b) using a stent-retriever or other thrombectomy device to remove the obstruction. Stent-retrievers are well-known in the art and include, for example, Applicant Legacy Venture LLC dba Vesalio's NEVA thrombectomy devices (Nashville, Tenn., the SOLITAIRE revascularization device (Medtronic, Minneapolis, Minn.), the Trevo XP PROVUE retriever (Stryker, Kalamazoo, Mich.) and various aspiration devices. Typically, such devices are deployed form a catheter.

Part List

| | |
|---|---|
| flow model | 10 |
| pump | 12 |
| reservoir | 14 |
| distal artificial artery | 16 |
| distal artificial artery open proximal end | 18 |

Part List -continued

| | |
|---|---|
| distal artificial artery open distal end | 20 |
| artificial vein | 22 |
| artificial head | 24 |
| artificial nose | 26 |
| artificial vein proximal end | 28 |
| distal artificial artery diameter | 30 |
| artificial heart | 32 |
| artificial chest | 34 |
| proximal artificial artery | 36 |
| valve | 38 |
| proximal artificial artery proximal end | not shown |
| proximal artificial artery distal end | 42 |
| proximal connector | 44 |
| intermediate artificial artery | 46 |
| intermediate artificial artery proximal end | 48 |
| intermediate artificial artery distal end | 50 |
| distal connector | 52 |
| Proximal end distal connector | 53 |
| artificial neck | 54 |
| arch | 56 |
| battery | 58 |
| skeletal framework | 60 |
| downstream reservoir | 62 |
| power adapter | 64 |
| wires | 66 |
| on/off switch | 68 |
| power inlet | 70 |
| flasher relay | 72 |
| 3 way solenoid valve | 74 |
| coronary artery | 76 |

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:
1. A flow model comprising:
a pump configured to transport a liquid;
a reservoir downstream from the pump and configured to hold a liquid;
at least one distal artificial artery downstream from the pump and upstream from the reservoir, the at least one artificial artery generally tubular in shape, the at least one distal artificial artery comprising an open proximal end and an open distal end, the open distal end not connected to a tube and located in the reservoir, the at least one distal artificial artery configured to transport a liquid from the open proximal end to the open distal end and into the reservoir;
at least one artificial vein downstream from the reservoir and the at least one distal artificial artery and configured to transport a liquid from the reservoir,
wherein the pump is configured to pump the liquid from the pump, into the at least one distal artificial artery open proximal end, then into the at least one distal artificial artery open distal end, then into the reservoir, and then into the at least one artificial vein, and further wherein the flow model is in the form of a manikin comprising at least a head portion comprising the at least one distal artificial artery and a chest portion comprising an artificial heart.

2. The flow model of claim 1 wherein the reservoir is sealed.

3. The flow model of claim 1 wherein the reservoir is located in the head portion.

4. The flow model of claim 3 wherein the head portion comprises an artificial nose and further wherein the at least one artificial vein has a proximal end located in the artificial nose.

5. The flow model of claim 1 wherein the at least one artificial vein is configured to at least partially return the liquid back to the pump after exiting the reservoir.

6. The flow model of claim 1 wherein the flow model comprises a plurality of distal artificial arteries comprising an open distal end not connected to a tube and configured to drain into the reservoir.

7. The flow model of claim 6 further wherein at least some of the plurality of distal artificial arteries are curved.

8. The flow model of claim 1 wherein the pump is battery-powered.

9. The flow model of claim 1 wherein the pump comprises a motor and an on and off switch.

10. The flow model of claim 1 wherein the reservoir comprises animal blood or artificial animal blood.

11. The flow model of claim 1 wherein at least a segment of the at least one distal artificial artery has a diameter of less than about 35 micrometers.

12. The flow model of claim 1 wherein the pump is at least partially located in the chest portion.

13. The flow model of claim 1 wherein the artificial heart further comprises at least one proximal artificial artery downstream from the pump, upstream from the at least one distal artificial artery, at least partially located in the heart, and comprising at least one valve.

14. The flow model of claim 1 wherein the flow model further comprises at least one proximal artificial artery comprising an open proximal end connected to the heart and an open distal end attached to a proximal connector.

15. The flow model of claim 14 wherein the flow model further comprises at least one intermediate artificial artery comprising an open proximal end removably attached to the proximal connector and an open distal end.

16. The flow model of claim 15 wherein the open distal end of the at least one intermediate artificial artery is connected to a distal connector.

17. The flow model of claim 16 wherein the distal connector is located in a neck portion of the manikin and the distal connector connects a plurality of pairs of blood vessels simultaneously.

18. The flow model of claim 17 wherein the at least one intermediate artery is curved.

19. The flow model of claim 18 wherein the at least one intermediate artery comprises an arch.

20. A flow model comprising:
a pump configured to transport a liquid;
a reservoir downstream from the pump and configured to hold a liquid;
at least one distal artificial artery downstream from the pump and upstream from the reservoir, the at least one artificial artery generally tubular in shape, the at least one distal artificial artery comprising an open proximal end and an open distal end, the open distal end not connected to a tube and located in the reservoir, the at least one distal artificial artery configured to transport a liquid from the open proximal end to the open distal end and into the reservoir;
at least one artificial vein downstream from the reservoir and the at least one distal artificial artery and configured to transport a liquid from the reservoir,
wherein the pump is configured to pump the liquid from the pump, into the at least one distal artificial artery open proximal end, then into the at least one distal artificial artery open distal end, then into the reservoir, and then into the at least one artificial vein, and further wherein the reservoir is located in an artificial human head.

21. A flow model comprising:
a pump configured to transport a liquid;
a reservoir downstream from the pump and configured to hold a liquid;
a plurality of artificial arteries downstream from the pump and upstream from the reservoir, the plurality of artificial arteries generally tubular in shape, the plurality of artificial arteries each comprising an open proximal end and an open distal end, the open distal ends not connected to a tube and located in the reservoir, the plurality of artificial arteries configured to transport a liquid from the open proximal ends to the open distal ends and into the reservoir;
at least one artificial vein downstream from the reservoir and the plurality of distal artificial arteries and configured to transport a liquid from the reservoir,
wherein the pump is configured to pump the liquid from the pump, through the plurality of artificial arteries, then into the reservoir, and then into the at least one artificial vein.

\* \* \* \* \*